United States Patent [19]

Kogane

[11] Patent Number: 4,568,180

[45] Date of Patent: Feb. 4, 1986

[54] PRINT MASK DEVICE

[75] Inventor: Mikio Kogane, Kanagawa, Japan

[73] Assignee: Fuji Photo Film Co., Ltd., Kanagawa, Japan

[21] Appl. No.: 606,100

[22] Filed: May 2, 1984

[30] Foreign Application Priority Data

May 2, 1983 [JP] Japan ................................. 58-77988

[51] Int. Cl.⁴ ............................................ G03B 27/58
[52] U.S. Cl. ..................................................... 355/74
[58] Field of Search ............................. 355/74, 54, 64

[56] References Cited

U.S. PATENT DOCUMENTS 3,737,227 6/1973 Harter et al. ......................... 355/74
3,807,861 4/1974 Nosco et al. ...................... 355/74 X Primary Examiner—Richard A. Wintercorn
Attorney, Agent, or Firm—Sughrue, Mion, Zinn, Macpeak, and Seas

[57] ABSTRACT

A print mask device for which a mask opening size can be easily set without removing the print mask device from the printing device in which it is installed. First and second L-shaped mask members are provided, each having edges extending parallel to the widthwise and lengthwise directions of the print paper, with the mask opening being defined between the two mask members. Each of the mask members has a pair of externally extending racks affixed thereto engaged with and slidable along respective rack gears, the two rack gears extending parallel to the widthwise and lengthwise directions of the print paper. The rack gears can be rotated by associated pulse motors to automatically set the mask opening.

4 Claims, 5 Drawing Figures

PRINT MASK DEVICE

BACKGROUND OF THE INVENTION

The present invention relates to print mask devices, and more particularly to a print mask device the opening area of which is adjustable in two directions, that is, in longitudinal and lateral directions.

Various popular print sizes such as the E size (about 82.5 mm×115 mm) and B size (about 85 mm×85 mm) are commonly available for color prints. However, in the case of the E size, different lengths, for instance, 114 mm, 117 mm and 120 mm, are customarily available for the same width (about 82.5 mm). Pictures can be printed on such different sizes of print paper with or without a border as required by the customer.

Accordingly, provision of a printing device which can freely print pictures in a variety of sizes has been demanded by color picture developing laboratories.

A roll of print paper is generally used with a printing device, and pictures are printed thereon successively. It goes without saying that, in the case where print papers to be used are different in width, various print masks must be used. Also, to accommodate print papers of equal widths but different lengths and bordered and borderless printing various print masks must be selectively provided. This is a problem involved in the printing of pictures onto a roll of print paper.

A print mask device capable of changing a print paper size by adjusting only the length is required for selectively use with various print paper sizes which are equal in width but different in length. Such a device has been disclosed in Japanese Patent Application No. 164095/1979 (Japanese Laid-Open Patent Application No. 87032/1981) filed by the present applicant, and can be effectively used.

However, in the case where, for prints of the same size, to switch between bordered and borderless printing, it is necessary to provide a print mask device which can change the width and length of the printed image. However, a print mask device in which the width and length of the printed image can be externally changed with ease without removing the mask from the printing equipment has as yet not been available.

In view of the foregoing, an object of the invention is to provide a print mask device in which the width and length of a printed image can be externally varied with ease while remaining installed in a printing device.

SUMMARY OF THE INVENTION

The foregoing object of the invention has been achieved by the provision of a print mask device in which, according to the invention, first and second mask members are provided, each having edges parallel to the widthwise and lengthwise directions of a print paper and arranged opposed to each other. The mask members are provided with a first drive transfer means which is adapted to move the mask member in the widthwise direction of the print paper but in the lengthwise direction of the mask member, and second drive transfer means which is adapted to move the mask members in the lengthwise direction of the print paper but in the widthwise direction of the mask member, with the two mask members being movable in opposite directions.

DESCRIPTION OF THE PREFERRED EMBODIMENTS

Preferred embodiments of the invention will now be described in detail with reference to the accompanying drawings.

Figure 1:
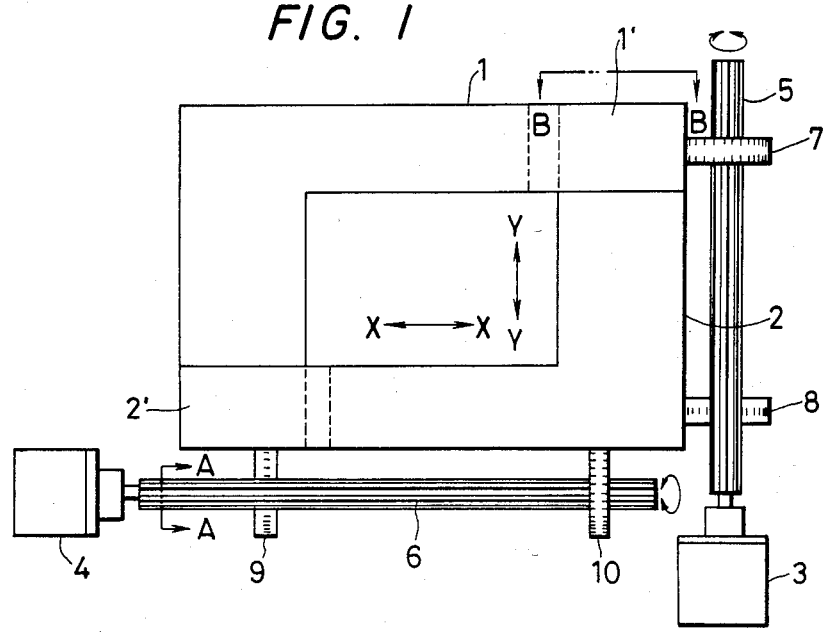
FIG. 1 is a plan view showing a preferred embodiment of a print mask device invention.
Figure 2:
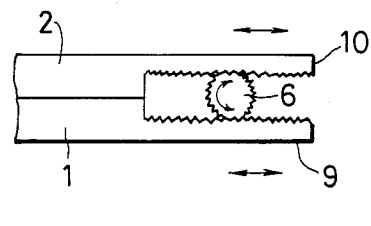
FIG. 2 is a diagram, partly as a sectional diagram, as viewed in the direction of arrows A—A in FIG. 1.

FIG. 1 is a plan view showing a preferred embodiment of a print mask device of the invention, and FIG. 2 is a sectional view taken along a line A—A in FIG. 1. In these figures, reference numerals 1 and 2 designate first and second mask members, respectively; 3 and 4, motors for moving the first and second mask members 1 and 2 in the X and Y directions, respectively; 5 and 6, pinion shafts connected to the motors 3 and 4, respectively; 7 and 8, racks secured to the first and second mask members 1 and 2, respectively, and engaged with the pinion shaft 5; and 9 and 10, racks secured to the first and second mask members 1 and 2, respectively, and engaged with the pinion shaft 6. Each of the pinion shafts is engaged with the respective racks as shown in FIG. 2. That is, the pinion shaft 5 (or 6) is engaged with the respective racks 7 and 8 (or 9 and 10) in such a manner that the racks are on both sides of the pinion shaft and the racks 7 and 8 (or 9 and 10) are movable by the respective pinion shaft 5 (or 6). Accordingly, when the motors 3 and 4 are operated to turn the pinion shafts 5 and 6, the mask members 1 and 2 are moved in the X and Y directions, namely, they are moved towards each other or moved away from each other depending on the direction of rotation of the motors 3 and 4.

Figure 3:
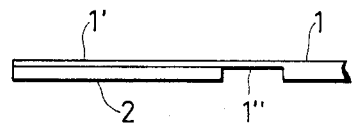
FIG. 3 is a diagram viewed in the direction of arrows B—B in FIG. 1.

FIG. 3 is a sectional view taken along a line B—B in FIG. 1 showing the parts of the mask members 1 and 2 which overlap each other. As is apparent from FIG. 3, one end part of the mask member 1 (which overlaps the mask member 2) is thinner than the other part. That is, the mask member 1 has at one end a thinner part 1' forming a step 1", while one end part of the mask member 2 (which overlaps the mask member 1) is laid over the thinner part 1' of the mask member 1. Similarly, the mask member 1 and 2 overlap each other at the other end. That is, the mask member 2 has at the other end a thinner part 2' and the other end part of the mask member 1 is laid over the thinner part of the mask member 2. In the described embodiment, each of the thinner parts 1' and 2' is about 0.8 mm thick. Such dimensioning is sufficient to substantially eliminate unclear printing of a picture on a print paper which is placed on the print mask device. The thinner parts are long enough to cover the movement of the mask members 1 and 2 in the X direction.

In the above-described embodiment, the mask member moving motors 3 and 4 are pulse motors. The movement of each mask member from a predetermined reference position is controlled by the number of drive pulses applied to the pulse motor. Accordingly, the print size can be readily set.

Figure 4:
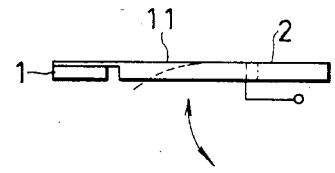
FIGS. 4 and 5 are side views showing details of the print mask device of FIG. 1.
Figure 5:
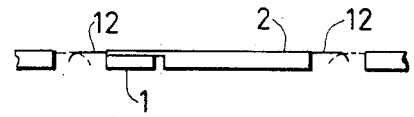

A device for printing a brand mark onto a print paper, a device for printing a cut mark and sort mark which are used in printing a picture with a border, or a device for blanking a cut mark and sort mark which are used in printing a picture without a border can be provided on the mask members 1 and 2 where the movement is not obstructed. As shown in FIG. 4, a print paper guide plate 11 may be provided in the opening of the print mask device in such a manner that it is turnable from below so that, when a print paper is automatically loaded, the passage of the print paper is not obstructed. It is also effective for print paper conveying members 12 to be provided before and after the print mask device in the direction of movement of the print paper.

In the case where bordered and borderless printing are to be carried out with the same size print paper, with the print mask device thus constructed according to the invention, it is possible to switch between these operations merely by moving the mask members 1 and 2 in the X and Y directions as required. In case of changing the print size accompanied by changing the width of the print paper, after the first print paper is removed, the motor 4 is driven to change the width set by the mask members 1 and 2, and then the print paper guide plate 11 is allowed to enter the opening of the print mask member to feed the new print paper. Before or after the new print paper has been fed, the motor 3 is driven to position the mask members 1 and 2 in the longitudinal direction.

As is apparent from the above description, in the print mask device according to the invention, the two mask members each having respective edges parallel to the widthwise and lengthwise direction of a print paper, are arranged to define an image area. The mask members are provided with first and second means which respectively move the mask members in the widthwise direction of a print paper but in the lengthwise direction of the mask members and which move the mask members in the lengthwise direction of the print paper but in the widthwise direction of the mask members in such a manner that the two mask members are moved in opposite directions by the drive transfer means. Thus, the print mask device according to the invention, can be externally controlled with ease to change the printing size without having to remove it from the printing equipment. This is one of the significant effects of the invention.

I claim:
1. A print mask device comprising:
first and second mask members, each of said mask members having a substantially L shape having edges extending parallel to both the widthwise and lengthwise directions of a print paper with said first and second mask members being arranged partially overlapping one another to define an image area; and
first and second drive transfer means, said first drive transfer means being coupled to said first and second mask members to move said first and second mask members in a widthwise direction of said print paper, and said second drive transfer means being coupled to said first and second mask members to move said first and second mask members in a lengthwise direction of said print paper, said first and second drive transfer means simultaneously moving said first and second mask members in opposed directions;
wherein each of said first and second mask members has first and second racks affixed thereto, and said first and second drive transfer means each comprises a motor and a rack gear rotated by said motor, each said rack gear being engaged with a rack affixed to each of said first and second drive transfer means.

2. The print mask device of claim 1, wherein said rack gear of said first drive transfer means extends parallel to said widthwise direction of said print paper, and the rack gear of said second drive transfer means extends parallel to said lengthwise direction of said print paper.

3. The print mask device of claim 2, wherein said racks are slidable along said rack gears.

4. The print mask device of claim 1, wherein said first and second racks of said first and second mask members face opposite directions from one another.

* * * * *